(12) United States Patent
Jung et al.

(10) Patent No.: US 11,757,309 B2
(45) Date of Patent: *Sep. 12, 2023

(54) APPARATUS AND METHOD FOR DETECTING FOREIGN OBJECTS IN WIRELESS POWER TRANSMISSION SYSTEM

(71) Applicant: GE Hybrid Technologies, LLC, Niskayuna, NY (US)

(72) Inventors: Chun-Kil Jung, Seoul (KR); Sug Ky Hong, Seoul (KR)

(73) Assignee: GE Hybrid Technologies, LLC, Niskayuna, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/466,046

(22) Filed: Sep. 3, 2021

(65) Prior Publication Data

US 2021/0399589 A1    Dec. 23, 2021

Related U.S. Application Data

(63) Continuation of application No. 16/557,407, filed on Aug. 30, 2019, now Pat. No. 11,139,698, which is a
(Continued)

(30) Foreign Application Priority Data

Jul. 10, 2012    (KR) .......................... 10-2012-0075276

(51) Int. Cl.
*H02J 50/60* (2016.01)
*H02J 50/12* (2016.01)
(Continued)

(52) U.S. Cl.
CPC .......... *H02J 50/60* (2016.02); *H02J 7/00034* (2020.01); *H02J 50/10* (2016.02); *H02J 50/12* (2016.02); *H02J 50/80* (2016.02)

(58) Field of Classification Search
CPC .. H02J 50/60; H02J 5/005; H02J 7/025; H02J 17/00; B60L 53/124; H01F 38/14
See application file for complete search history.

(56) References Cited

U.S. PATENT DOCUMENTS 6,184,651 B1    2/2001    Fernandez et al.
7,835,762 B2    11/2010   Sendonaris
(Continued)

FOREIGN PATENT DOCUMENTS

CN    101488676    7/2009
CN    101981780    2/2011
(Continued)

OTHER PUBLICATIONS

"Chinese Application No. 201310285587 First Office Action", dated Mar. 18, 2016, 19 pages.
(Continued)

*Primary Examiner* — Rexford N Barnie
*Assistant Examiner* — David A Shiao
(74) *Attorney, Agent, or Firm* — DELIZIO, PEACOCK, LEWIN & GUERRA; John F. Guerra

(57) ABSTRACT

Aspects of the present invention relate to an apparatus and method for detecting foreign objects in a wireless power transmission system. This specification provides a wireless power reception apparatus for detecting foreign objects, including a power measurement unit for generating required power information indicative of required power for the wireless power reception apparatus, sending the required power information to a wireless power transmission apparatus, and measuring power induced from the wireless power transmission apparatus and a secondary coil for receiving the power induced from the wireless power transmission apparatus. In accordance with the present invention, foreign objects intervened between the wireless power trans-
(Continued)

mission apparatus and the wireless power reception apparatus are recognized, and a user removes the foreign objects. Accordingly, damage to a device attributable to foreign objects can be prevented.

17 Claims, 9 Drawing Sheets

Related U.S. Application Data continuation of application No. 15/701,275, filed on Sep. 11, 2017, now Pat. No. 10,439,445, which is a continuation of application No. 13/939,035, filed on Jul. 10, 2013, now Pat. No. 9,762,092.

(51) Int. Cl.
*H02J 50/80* (2016.01)
*H02J 50/10* (2016.01)
*H02J 7/00* (2006.01)

(56) References Cited

U.S. PATENT DOCUMENTS

| | | |
|---|---|---|
| 7,948,208 B2 | 5/2011 | Partovi et al. |
| 8,004,235 B2 | 8/2011 | Baarman et al. |
| 8,111,042 B2 | 2/2012 | Bennett |
| 8,183,827 B2 | 5/2012 | Lyon |
| 8,374,545 B2 | 2/2013 | Menegoli et al. |
| 8,390,249 B2 | 3/2013 | Wally et al. |
| 8,577,479 B2 | 11/2013 | Wakamatsu |
| 8,629,654 B2 | 1/2014 | Partovi et al. |
| 9,018,898 B2 | 4/2015 | Ziv et al. |
| 9,024,484 B2 | 5/2015 | Park et al. |
| 9,030,051 B2 | 5/2015 | Muratov |
| 9,118,357 B2 | 5/2015 | Tseng |
| 9,106,203 B2 | 8/2015 | Kesler et al. |
| 9,118,203 B2 | 8/2015 | Davis |
| 9,124,307 B2 | 9/2015 | Kudo et al. |
| 9,178,369 B2 | 11/2015 | Partovi |
| 9,219,385 B2 | 12/2015 | Kim et al. |
| 9,252,846 B2 | 2/2016 | Lee et al. |
| 9,294,153 B2 | 3/2016 | Muratov et al. |
| 9,306,401 B2 | 4/2016 | Lee et al. |
| 9,354,620 B2 | 5/2016 | Ben-Shalom et al. |
| 9,444,289 B2 | 9/2016 | Park et al. |
| 9,478,991 B2 | 10/2016 | Weissentern et al. |
| 9,496,741 B2 | 11/2016 | Lee et al. |
| 9,530,558 B2 | 12/2016 | Nakano et al. |
| 9,553,485 B2 | 1/2017 | Singh |
| 9,656,559 B2 | 5/2017 | Konno et al. |
| 10,439,445 B2 | 10/2019 | Jung et al. |
| 11,139,698 B2 | 10/2021 | Jung et al. |
| 2004/0267501 A1 | 12/2004 | Freed et al. |
| 2007/0216392 A1 | 9/2007 | Stevens et al. |
| 2007/0228833 A1 | 10/2007 | Stevens et al. |
| 2008/0174267 A1 | 7/2008 | Onishi et al. |
| 2008/0197712 A1 | 8/2008 | Jin et al. |
| 2009/0096414 A1 | 4/2009 | Cheng et al. |
| 2009/0230777 A1 | 9/2009 | Baarman et al. |
| 2009/0322280 A1 | 12/2009 | Kamijo et al. |
| 2010/0181961 A1 | 7/2010 | Von Novak et al. |
| 2010/0225173 A1 | 9/2010 | Aoyama et al. |
| 2010/0264746 A1 | 10/2010 | Kazama et al. |
| 2011/0062793 A1 | 3/2011 | Azancot et al. |
| 2011/0097608 A1 | 4/2011 | Park et al. |
| 2011/0196544 A1 | 8/2011 | Baarman et al. |
| 2011/0285349 A1 | 11/2011 | Widmer et al. |
| 2012/0038317 A1 | 2/2012 | Miyamoto et al. |
| 2012/0091993 A1 | 4/2012 | Uramoto et al. |
| 2012/0193993 A1 | 8/2012 | Azancot et al. |
| 2012/0200158 A1 | 8/2012 | Takei |
| 2012/0248889 A1 | 10/2012 | Fukushi et al. |
| 2012/0293011 A1 | 11/2012 | Byun et al. |
| 2012/0306285 A1 | 12/2012 | Kim et al. |
| 2012/0326521 A1 | 12/2012 | Bauer et al. |
| 2013/0015720 A1 | 1/2013 | Shimokawa et al. |
| 2013/0033228 A1 | 2/2013 | Ready |
| 2013/0094598 A1 | 4/2013 | Bastami |
| 2013/0147280 A1 | 6/2013 | Oettinger |
| 2013/0159956 A1 | 6/2013 | Verghese et al. |
| 2013/0207599 A1 | 8/2013 | Ziv et al. |
| 2013/0285618 A1 | 10/2013 | Iijima et al. |
| 2013/0285620 A1 | 10/2013 | Yamamoto et al. |
| 2013/0307348 A1 | 11/2013 | Unger |
| 2014/0008990 A1 | 1/2014 | Yoon |
| 2014/0015334 A1 | 1/2014 | Jung et al. |
| 2014/0091639 A1 | 4/2014 | Jung et al. |
| 2015/0155918 A1 | 6/2015 | Van Wageningen |
| 2017/0373542 A1 | 12/2017 | Jung et al. |
| 2019/0386523 A1 | 12/2019 | Jung et al. |

FOREIGN PATENT DOCUMENTS

| | | |
|---|---|---|
| CN | 102084442 | 6/2011 |
| CN | 102457107 | 5/2012 |
| CN | 102548789 | 7/2012 |
| CN | 103378638 | 10/2013 |
| EP | 1751834 | 2/2009 |
| EP | 2428969 | 3/2012 |
| GB | 2472700 | 4/2011 |
| JP | 2007537688 | 12/2007 |
| JP | 2010051137 | 3/2010 |
| JP | 2010183705 | 8/2010 |
| JP | 2010232814 | 10/2010 |
| JP | 2010239781 | 10/2010 |
| JP | 2011030422 | 2/2011 |
| JP | 2011083094 | 4/2011 |
| JP | 2013230007 | 11/2013 |
| WO | 03096512 | 11/2003 |
| WO | 2011097608 | 8/2011 |
| WO | 2012070479 | 5/2012 |

OTHER PUBLICATIONS

"Chinese Application No. 201310285587 Fourth Office Action", dated Jun. 13, 2018, 26 pages.
"Chinese Application No. 201310285587 Second Office Action", dated Nov. 2, 2016, 5 pages.
"Chinese Application No. 201310285587 Seventh Office Action", dated Dec. 6, 2019, 21 pages.
"Chinese Application No. 201310285587 Sixth Office Action", dated Mar. 1, 2019, 18 pages.
"Chinese Application No. 201310285587 Third Office Action", dated May 11, 2017, 5 pages.
"EP Application No. 13175384.0 Extended European Search Report and Opinion", dated Jan. 12, 2018, 9 pages.
"European Application No. 13175384.0 Communication pursuant to Article 94(3) EPC", dated Nov. 30, 2020, 6 pages.
"Japanese Application No. 2013142642 Notification of Reason for Refusal", dated Apr. 21, 2017, 3 pages.
"Japanese Application No. 2013142642 Notification of Reason for Refusal", dated Jul. 27, 2017, 2 pages.
"Korean Application No. 20120075276 First Office Action", dated Apr. 23, 2019, 3 pages.
"Korean Application No. 20120075276 Office Action", dated Nov. 4, 2019, 4 pages.
"Korean Application No. 20120075276 Written Opinion", dated Nov. 26, 2018, 3 pages.
"Qi System Description Wireless Power Transfer", Wireless Power Consortium, vol. 1:Low Power, Part 1:Interface Definition, Version 1.0.1, Oct. 2010, 88 pages.
"U.S. Appl. No. 13/939,035 Final Office Action", dated Aug. 12, 2016, 20 pages.
"U.S. Appl. No. 13/939,035 Office Action", dated Jan. 15, 2016, 23 pages.
"U.S. Appl. No. 13/939,035 Office Action", dated Dec. 8, 2016, 19 pages.

(56) References Cited

OTHER PUBLICATIONS

"U.S. Appl. No. 14/099,333 Office Action", dated Mar. 10, 2016, 8 pages.
"U.S. Appl. No. 15/701,275 Office Action", dated Oct. 4, 2018, 14 pages.
"U.S. Appl. No. 16/557,407 Office Action", dated Dec. 18, 2020, 19 pages.
Kuyvenhoven, et al., "Developmental of a Foreign Object Detection and Analysis Method for Wireless Power Systems", Published in: Product Compliance Engineering (PSES), 2011 IEEE Symposium on Oct. 10-12, 2011 https://www.wirelesspowerconsortium.com/data/downloadables/6/9/1/pses-2011-fod-development.pdf, Oct. 2011, 6 pages.
Shimokawa, et al., "A Numerical Study of Power Loss Factors in Resonant Magnetic Coupling", Published in: Microwave Workshop Series on Innovative Wireless Power Transmission: Technologies, Systems, and Applications (IMWS), 2011 IEEE MTT-S International, May 2011.
Waffenschmidt, "Wireless Power for Mobile Devices", Philips Research Europe https://www.researchgate.net/publication/228852032_Wireless_power_for_mobile_devices, Oct. 2011, 9 pages.
Wang, et al., "Wireless Power Transfer with Metamaterials", Mitsubishi Electric Research Laboratories European Conference on Antennas and Propagation (EUCAP) https://pdfs.semanticscholar.org/87a0/a59d0d1edaf474e908b8cab68e014e0ae83a.pdf, Apr. 2011, 6 ages.
"European application No. 22150138.0 Extended European Search Report", dated Jul. 4, 2022, 10 pages.
"Korean Application No. 10-2021-0099287 Notification of Reason for Refusal", dated Nov. 4, 2021, 3 pages.
"European Patent Office application No. 22172360.4 Extended European Search Report", dated Oct. 25, 2022, 12 pages.
"Korea application No. 10-2021-0099287 Notice of Final Rejection", dated Sep. 13, 2022, 2 pages.

APPARATUS AND METHOD FOR DETECTING FOREIGN OBJECTS IN WIRELESS POWER TRANSMISSION SYSTEM

CROSS-REFERENCE TO RELATED APPLICATIONS

This application is a continuation and claims the priority benefit of U.S. patent application Ser. No. 16/557,407, filed Aug. 30, 2019, which is a continuation of U.S. patent application Ser. No. 15/701,275, filed Sep. 11, 2017, which is a continuation of U.S. patent application Ser. No. 13/939,035, filed Jul. 10, 2013, which claims the priority benefit of Korean Application No. 10-2012-0075276, filed Jul. 10, 2012, in the Korean Intellectual Property Office. All disclosures of the documents named above are incorporated herein by reference.

BACKGROUND OF THE INVENTION

1. Field of the Invention

Aspects of the present invention relate to the transmission of wireless power and, more particularly, to an apparatus and method for detecting foreign objects in a wireless power transmission system.

2. Description of the Related Art

In general, a battery pack functions to receive electric power (electrical energy) from an external charger and supply a power source for driving a portable terminal (e.g., a mobile phone or a PDA) in a charging state. The battery pack includes a battery cell for charging the electrical energy, a circuit for charging or discharging the battery cell (i.e., supply the electrical energy to the portable terminal), etc.

An electrical coupling method for coupling the battery pack and the charger for charging the battery pack used in this portable terminal with the electrical energy source. includes a terminal supply method for receiving a commercial power source, converting the commercial power source into voltage and current corresponding to the battery pack, and supplying electrical energy to the battery pack through the terminal of the battery pack.

However, the terminal supply method has problems, such as an instant discharge phenomenon due to a potential difference between terminals, damage and the occurrence of a fire due to foreign objects, natural discharge, and a reduction in the lifespan and performance of a battery pack.

In order to solve the problems, contactless type charging systems and control methods using a wireless power transmission method are being recently proposed.

The contactless type charging system includes a contactless power transmission apparatus for supplying electrical energy according to a wireless power transmission method, a contactless power reception apparatus for receiving the electrical energy from the contactless power transmission apparatus, and charging a battery cell with the electrical energy, etc.

Meanwhile, in the contactless type charging system, the contactless power reception apparatus is charged in the state in which it is placed in the contactless power transmission apparatus owing to the characteristics of the contactless method.

Here, if foreign objects, such as metal, are placed in the contactless power transmission apparatus, the transmission of the wireless power is not smoothly performed due to the foreign objects and there is a problem in that a product is damaged due to an overload.

SUMMARY OF THE INVENTION

An object of the present invention provides an apparatus and method for detecting foreign objects in a wireless power transmission system.

In accordance with an aspect of the present invention, there is provided a wireless power reception apparatus for detecting foreign objects. The apparatus includes a secondary coil magnetically or resonantly coupled with a primary coil included in a wireless power transmission apparatus and configured to receive wireless power and a power measurement unit configured to generate required power information indicative of a power required by the wireless power reception apparatus, send the required power information to the wireless power transmission apparatus, and measure the received wireless power.

The power measurement unit may configure a reception power measurement result obtained by comparing the required power with the measured wireless power and send the reception power measurement result to the wireless power transmission apparatus.

In accordance with another aspect of the present invention, there is provided a wireless power reception apparatus for detecting foreign objects. The apparatus includes a secondary coil coupled with a primary coil included in a wireless power transmission apparatus and configured to receive wireless power and a power measurement unit configured to generate required power information indicative of required power necessary for wireless charging, receive a generated power measurement report indicative of wireless power generated from the wireless power transmission apparatus from the wireless power transmission apparatus, configure a reception power measurement result obtained by comparing the required power with the generated wireless power and analyzing a result of the comparison, and send the required power information and the reception power measurement result to the wireless power transmission apparatus.

In accordance with yet another aspect of the present invention, there is provided a wireless power reception method of a wireless power reception apparatus detecting foreign objects. The method includes generating required power information indicative of required power for wireless charging, sending the required power information to a wireless power transmission apparatus, receiving wireless power using a secondary coil coupled with a primary coil included in the wireless power transmission apparatus, measuring the received wireless power, configuring a reception power measurement result obtained by comparing the required power with the measured wireless power and analyzing a result of the comparison, and sending the reception power measurement result to the wireless power transmission apparatus.

In accordance with yet another aspect of the present invention, there is provided a wireless power transmission apparatus for detecting foreign objects. The apparatus includes a control unit configured to receive required power information, indicative of required power necessary to charge a wireless power reception apparatus from the wireless power reception apparatus, generate a control signal for providing the required power, and send the control signal to an electricity driving unit, the electricity driving unit configured to apply an electricity driving signal to a primary coil in response to the control signal, and a primary coil coupled with the electricity driving unit, coupled with a secondary coil included in the wireless power reception apparatus, and configured to send wireless power.

The control unit may receive a reception power measurement result, obtained by comparing wireless power measured by the wireless power reception apparatus with the required power, from the wireless power reception apparatus.

In accordance with yet another aspect of the present invention, there is provided a wireless power transmission apparatus for detecting foreign objects. The apparatus includes a control unit configured to receive required power information indicative of required power necessary to charge a wireless power reception apparatus from the wireless power reception apparatus, generate a control signal for providing the required power, and send the control signal to an electricity driving unit, the electricity driving unit configured to apply an electricity driving signal to a primary coil in response to the control signal, a primary coil coupled with the electricity driving unit, coupled with a secondary coil included in the wireless power reception apparatus, and configured to send wireless power, and a power measurement unit configured to measure wireless power generated from the primary coil.

The control unit may configure a generated power measurement report indicative of the generated wireless power, send the generated power measurement report to the wireless power reception apparatus, and receive a reception power measurement result, obtained by comparing the generated wireless power with the required power and analyzing a result of the comparison, from the wireless power reception apparatus.

In accordance with yet another aspect of the present invention, there is provided a wireless power transmission method of a wireless power transmission apparatus detecting foreign objects. The method includes receiving required power information indicative of required power necessary to charge a wireless power reception apparatus from the wireless power reception apparatus, generating a control signal for providing the required power and applying an electricity driving signal to a primary coil included in the wireless power transmission apparatus, sending wireless power, generated from the primary coil in response to the electricity driving signal, to the wireless power reception apparatus including a secondary coil coupled with the primary coil, and receiving a reception power measurement result, obtained by comparing wireless power measured by the wireless power reception apparatus with the required power and analyzing a result of the comparison, from the wireless power reception apparatus.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EMBODIMENTS

Figure 1:
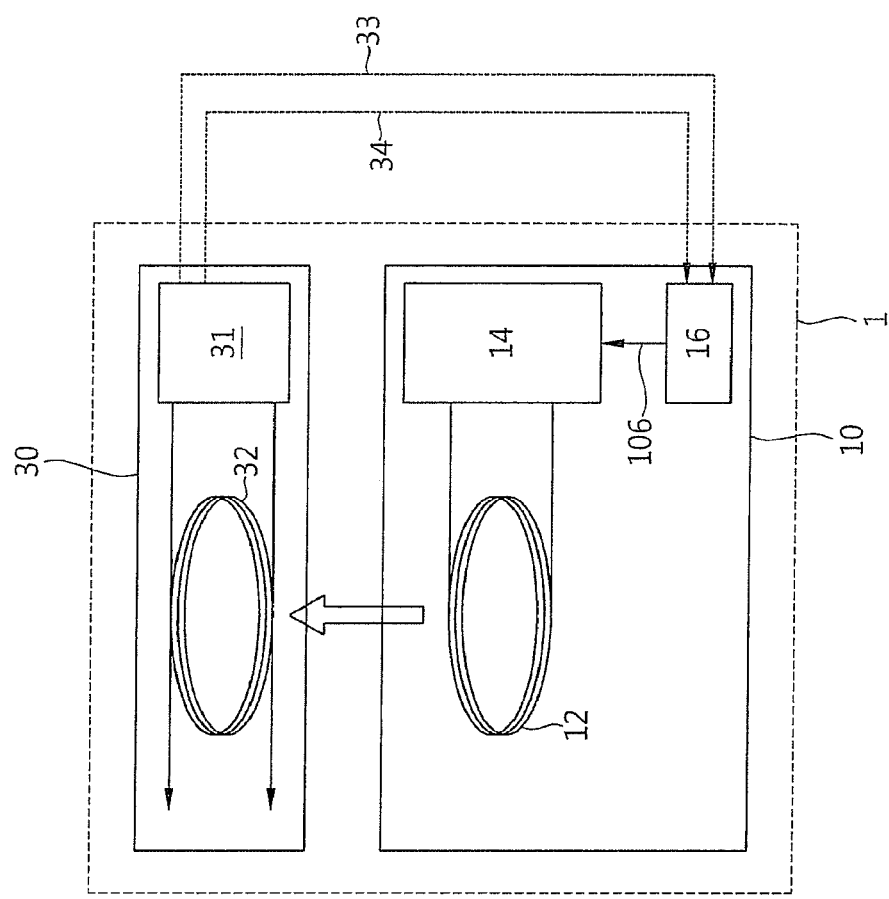
FIG. 1 illustrates the elements of a wireless power transmission system in accordance with an example of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, embodiments of the present invention will be described in detail with reference to the accompanying drawings so that they can be readily implemented by those skilled in the art. A term 'wireless power' used herein means energy having a specific form which is related to an electric field, a magnetic field, or an electromagnetic field transmitted from a transmitter to a receiver without using physical electromagnetic conductors. The wireless power may also be called a power signal and may mean an oscillating magnetic flux enclosed by a primary coil and a secondary coil. For example, the conversion of power in a system in order to wirelessly charge a device, such as a mobile phone, a cordless telephone, iPod®, an MP3® player, and a headset, is described herein. In general, a basic transfer principle of wireless energy includes, for example, both a magnetic induction coupling method and a magnetic resonance coupling (i.e., resonant induction) method using frequencies less than 30 MHz. However, various types of frequencies including frequencies in which a license-free operation in relatively high radiation levels, for example, less than 135 kHz (LF) or 13.56 MHz (HF) is permitted may be used.

FIG. 1 illustrates the elements of a wireless power transmission system in accordance with an example of the present invention.

Referring to FIG. 1, the wireless power transmission system 1 includes a wireless power transmission apparatus 10 and at least one wireless power reception apparatus 30. The wireless power transmission apparatus 10 includes a primary coil 12 and an electricity driving unit 14 coupled with the primary coil 12 and configured to supply electricity driving signals to the primary coil 12 in order to generate an electromagnetic field. A control unit 16 is coupled with the electricity driving unit 14. The control unit 16 generates a control signal 106 that controls an AC signal necessary when the primary coil 12 generates an inductive magnetic field.

The wireless power transmission apparatus 10 can have a specific and proper form, and an exemplary form of the wireless power transmission apparatus 10 is a platform having a power transmission surface. A wireless power reception apparatus 30 can be placed on or near the platform.

The wireless power reception apparatus 30 can be separate from the wireless power transmission apparatus 10. The wireless power reception apparatus 30 includes a secondary coil 32 coupled with an electromagnetic field generated from the wireless power transmission apparatus 10 when the wireless power reception apparatus 30 is placed near the wireless power transmission apparatus 10. In this method, electric power can be transmitted from the wireless power transmission apparatus 10 to the wireless power reception apparatus 30 without a direct electrical contact. At this time, it is said that the primary coil 12 and the secondary coil 32 have been mutually subjected to magnetic induction coupling or resonant induction coupling.

The primary coil 12 and the secondary coil 32 can have specific and proper forms. Each of the primary coil 12 and the secondary coil 32 can be a copper wire on which high permeable magnetic materials, such as ferrite or amorphous metal, are surrounded. The secondary coil 32 may have a single core form or a dual coil form. Or, the secondary coil 32 may include two or more coils.

In general, the wireless power reception apparatus 30 is coupled with an external load (not shown) (here, the external load is also called the actual load of the wireless power reception apparatus) and configured to supply wireless power, received from the wireless power transmission apparatus 10, to the external load. The wireless power reception apparatus 30 can be delivered to an object requiring electric power, such as a portable electrical or electronic device, a rechargeable battery, or a cell.

The wireless power reception apparatus 30 of the wireless power transmission system 1 of FIG. 1 further includes a power measurement unit 31 coupled with the secondary coil 32.

The power measurement unit 31 generates required power information 33 indicative of power required or requested by the wireless power reception apparatus 30 and sends the required power information 33 to the control unit 16. The required power information 33 is control information for controlling wireless power to be supplied to the wireless power reception apparatus 30. The wireless power transmission system 1 of FIG. 1 supports a unidirectional communication method by which control information is transmitted along a path from the wireless power reception apparatus 30 to the wireless power transmission apparatus 10.

For example, the required power information 33 can numerically indicate the amount of power required by the wireless power reception apparatus 30. For example, if the wireless power reception apparatus 30 needs electric power of 10 W, the power measurement unit 31 can generate the required power information 33 indicative of 10 W.

The control unit 16 checks the required power information 33 and generates the control signal 106 so that electric power indicated by the required power information 33 is generated. For example, when the required power information 33 indicates 10 W, the control unit 16 generates the control signal 106 so that electric power of 10 W is transmitted. The electricity driving unit 14 receives the control signal 106 and converts the received control signal 106 into an AC signal in the primary coil 12 in order to generate an induction or resonant magnetic field near the primary coil 12.

The power measurement unit 31 measures wireless power (or received wireless power) that is transferred from the primary coil 12 to the secondary coil 32 in response to the AC signal. The wireless power measured by the power measurement unit 31 can be calculated based on a difference between wireless power, transferred from the primary coil 12 to the secondary coil 32, and other losses due to foreign objects, such as a parasitic load near the wireless power transmission system 1.

For example, it is assumed that wireless power of 10 W is generated from the primary coil 12 in response to the required power information 33 and then transferred to the secondary coil 32 and power of 2 W is lost due to foreign objects. Here, power actually transferred to the secondary coil 32 (i.e., power actually received by the secondary coil 32) is 8 W. The power actually received by the secondary coil 32 is called received power, and the received power is the total amount of power dissipated within the wireless power reception apparatus 30 due to a magnetic field generated from the wireless power transmission apparatus.

The power measurement unit 31 sends or provides a reception power measurement result 34, reporting the results of measurement power obtained by comparing required power with measured (or actually received) power and analyzing the comparison result, to the control unit 16.

In an embodiment, the power measurement unit 31 can indicate a difference between required power and measured power as the reception power measurement result 34. In this case, the reception power measurement result 34 indicates 2 W.

In another embodiment, the power measurement unit 31 can indicate a measured power value itself as the reception power measurement result 34. In this case, the reception power measurement result 34 indicates 8 W.

In yet another embodiment, the power measurement unit 31 can indicate a flag form (0 or 1), indicating whether there is a difference between required power and measured power or not, as the reception power measurement result 34. For example, if there is no difference between the required power and the measured power, a flag is set to 1 (i.e., flag=1). If there is a difference between the required power and the measured power, a flag is set to 0 (i.e., flag=0), and the vice versa. In the above example, the reception power measurement result 34 indicates 1.

In yet another embodiment, the power measurement unit 31 can determine whether a difference between required power and measured power is greater than or equal to or smaller than a threshold value and indicate a result of the determination as the reception power measurement result 34. For example, if a difference between the required power and the measured power is greater than the threshold value, the reception power measurement result 34 can be set to 1. If a difference between the required power and the measured power is smaller than or equal to the threshold value, the reception power measurement result 34 can be set to 0. In the above example, if the threshold value is 1 W, the reception power measurement result 34 indicates 1 because lost power 2 W is greater than 1 W. If a difference between the required power and the measured power is greater than the threshold value, the reception power measurement result 34 (=1) has the same meaning as a Foreign Object Detection (FOD) declaration (described below) because it means that foreign objects have been detected. For example, if the reception power measurement result 34 continues to be 1 without change for a specific time, the wireless power transmission apparatus 10 can stop or suspend the transmission of wireless power because it means that foreign objects continue to be present.

In yet another embodiment, if there is a difference between required power and measured power, this has the same meaning as the FOD declaration. In this case, the power measurement unit 31 can provide the control unit 16 with the reception power measurement result 34 indicative of the FOD declaration. If there is no difference between required power and measured power, the power measurement unit 31 may not provide any signal to the control unit 16.

The control unit 16 receives the reception power measurement result 34. If it is determined that a significant parasitic load is present near the wireless power transmission apparatus 10 based on the reception power measurement result 34, the control unit 16 can enter a suspending mode in which the driving of the primary coil 12 is decreased or stopped so that the generation of the parasitic load is prevented. Accordingly, the supply of inefficient induction power can be limited or stopped. That is, the wireless power transmission apparatus 10 takes an action against the detection of foreign objects. Or, the power measurement unit 31 can enter a suspending mode in which the driving of the primary coil 12 is decreased or stopped in order to prevent the generation of the parasitic load. That is, the wireless power reception apparatus 30 takes an action against the detection of foreign objects.

As described above, the present invention provides unidirectional power control technology in which the wireless power reception apparatus 30 sends a signal to the wireless power transmission apparatus 10 and the additional power measurement unit 31 also measures power transmitted by the wireless power transmission apparatus 10, compares the measured power with required power, and provides a result of the comparison to the wireless power transmission apparatus 10.

Figure 2:
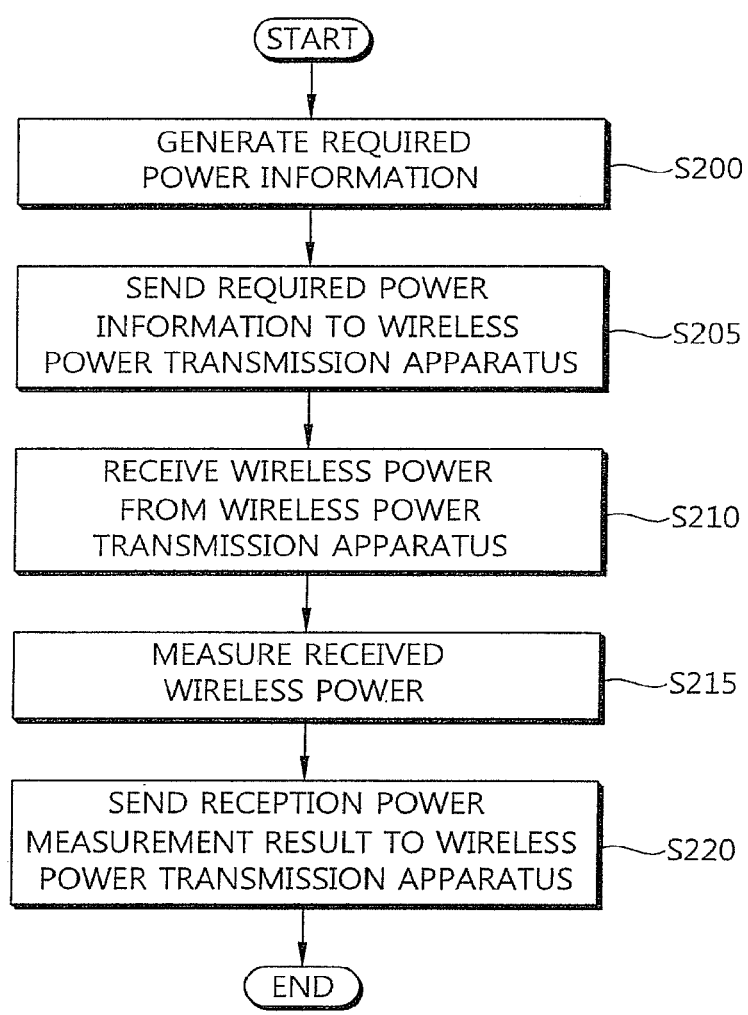
FIG. 2 illustrates an example of a method by which a wireless power reception apparatus using the present invention detects foreign objects.

FIG. 2 illustrates an example of a method by which the wireless power reception apparatus 30 using the present invention detects foreign objects.

Referring to FIG. 2, the wireless power reception apparatus 30 generates the required power information indicative of power requested by the wireless power reception apparatus 30 at step S200.

The wireless power reception apparatus 30 sends the required power information to the wireless power transmission apparatus 10 at step S205. When the primary coil 12 of the wireless power transmission apparatus 10 generates the required power in response to the required power information, the wireless power reception apparatus 30 receives wireless power based on magnetic induction or magnetic resonance from the wireless power transmission apparatus 10 using the secondary coil 32 at step S210.

The wireless power reception apparatus 30 measures wireless power received in response to the required power information at step S215. Here, the measured power can be calculated based on a difference between initial wireless power (or the required power), transferred from the wireless power transmission apparatus 10 to the wireless power reception apparatus 30, and other losses due to foreign objects, such as a nearby parasitic load.

The wireless power reception apparatus 30 provides the wireless power transmission apparatus 10 with a reception power measurement result that reports a result of comparison and analysis for the required power and the measured power at step S215.

In an embodiment, the wireless power reception apparatus 30 can indicate a difference between the required power and the measured power as the reception power measurement result 34.

In another embodiment, the wireless power reception apparatus 30 can indicate the measured power value itself as the reception power measurement result 34.

In yet another embodiment, the wireless power reception apparatus 30 can indicate a flag form (0 or 1), indicating whether or not there is a difference between the required power and the measured power, as the reception power measurement result.

In yet another embodiment, the wireless power reception apparatus 30 can determine whether a difference between the required power and the measured power is greater than or equal to or smaller than a threshold value and indicate a result of the determination as the reception power measurement result 34.

In yet another embodiment, if there is a difference between the required power and the measured power, the wireless power reception apparatus 30 can provide the wireless power transmission apparatus 10 with the reception power measurement result 34 indicating the difference. If there is no difference between the required power and the measured power, the wireless power reception apparatus 30 may not provide the reception power measurement result 34 to the wireless power transmission apparatus 10. In this case, the step S220 may not occur.

In yet another embodiment, the wireless power reception apparatus 30 can determine whether the measured power is greater than or smaller than the required power and indicate a result of the determination as the reception power measurement result 34. For example, the reception power measurement result can be indicated by 'high' or 'low'. Here, 'high' indicates that the measured power is greater than the required power, and 'low' indicates that the measured power is smaller than the required power. Or, the reception power measurement result may be indicated by one of three states, including 'high', 'low', and 'equal'.

Figure 3:
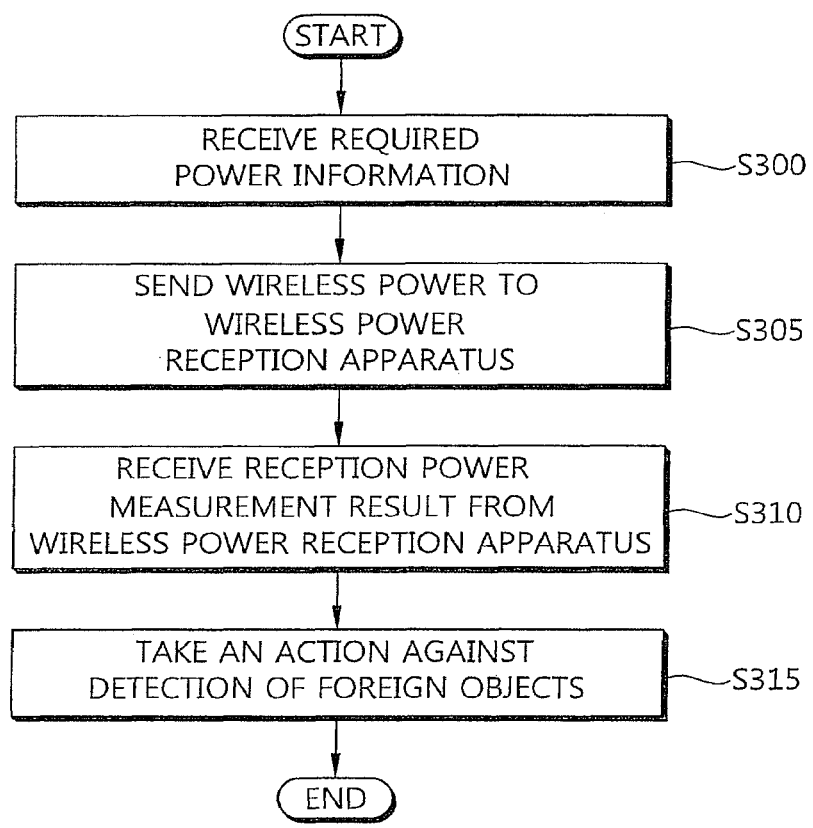
FIG. 3 illustrates an example of a method by which a wireless power transmission apparatus using the present invention detects foreign objects.

FIG. 3 illustrates an example of a method by which the wireless power transmission apparatus 10 using the present invention detects foreign objects.

Referring to FIG. 3, the wireless power transmission apparatus 10 receives the required power information 33 from the wireless power reception apparatus 30 at step S300. The wireless power transmission apparatus 10 sends wireless power to the wireless power reception apparatus 30 in accordance with a magnetic induction or magnetic resonance method in response to required power indicated by the required power information 33 at step S305.

The wireless power transmission apparatus 10 receives the reception power measurement result 34, reporting an actual measurement result of the wireless power transmitted in response to the required power by the wireless power reception apparatus 30, from the wireless power reception apparatus 30 at step S310.

If it is determined that foreign objects have been detected as a result of analyzing the reception power measurement result 34, the wireless power transmission apparatus 10 enters the suspending mode in which the driving of the primary coil 12 is decreased or stopped. Accordingly, the generation of heat from a parasitic load can be prevented, and the supply of inefficient induction power can be limited or stopped.

Figure 4:
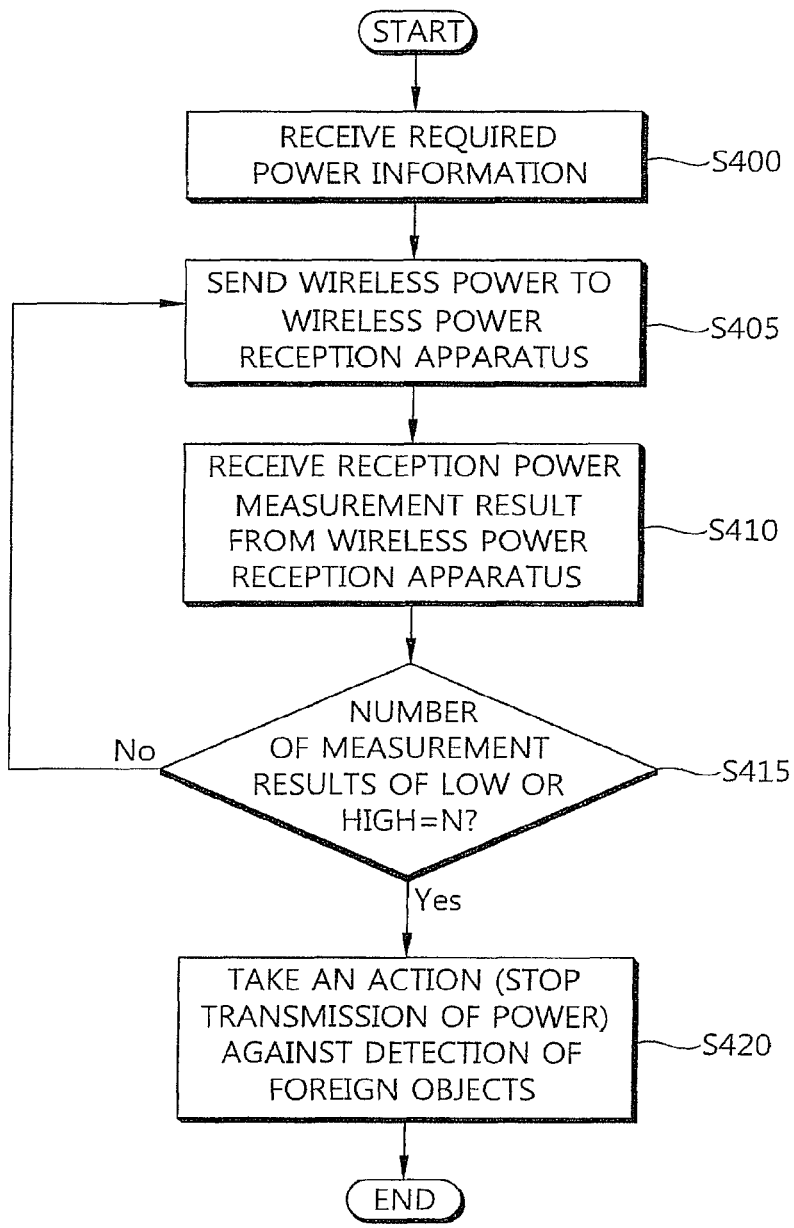
FIG. 4 illustrates another example of a method by which the wireless power transmission apparatus using the present invention detects foreign objects.

FIG. 4 illustrates another example of a method by which the wireless power transmission apparatus 10 using the present invention detects foreign objects.

Referring to FIG. 4, the steps S400 to S410 are the same as the respective steps S300 to S310 of FIG. 3, and thus a detailed description thereof is omitted. Meanwhile, the step S410 can be limited by the following various embodiments.

For example, in an embodiment in which the reception power measurement result indicates whether the measured power is greater than ('high') or smaller than ('low') the required power, the wireless power transmission apparatus 10 determines whether or not the reception power measurement result 34 indicating low or 'high' has been received N times identically and continuously at step S415. Here, N indicates the number of times of continuous reception of 'low' or 'high' that is necessary for the wireless power transmission apparatus 10 to stop the transmission of wireless power, and N can be 2 (i.e., N=2). For example, if the reception power measurement result indicating 'low' has been continuously received twice, the wireless power transmission apparatus 10 can stop the transmission of the wireless power as a measure against the detection of foreign objects at step S420. In contrast, if the reception power measurement result indicating 'high' has been continuously received twice, the wireless power transmission apparatus 10 can stop the transmission of the wireless power as a measure against the detection of foreign objects at step S420.

In contrast, if the reception power measurement result indicating 'low' or 'high' has been continuously received less than two times, the wireless power transmission apparatus 10 sends the wireless power to the wireless power reception apparatus 30 again at step S405. For example, if the reception power measurement result previously indicating 'low' was received, but the reception power measurement result now indicating 'high' is received, the wireless power transmission apparatus 10 does not stop the transmission of the wireless power because the same reception power measurement result does not continue to be received.

For another example, in an embodiment in which the reception power measurement result 34 indicates that there is a difference between the required power and the measured power, if the wireless power transmission apparatus 10 continues to receive the reception power measurement result indicative of 'present difference' N times, the wireless power transmission apparatus 10 can stop the transmission of the wireless power as a measure against the detection of foreign objects at step S420.

For yet another example, in an embodiment in which the reception power measurement result 34 indicates that a difference between the required power and the measured power is greater than or equal to or smaller than the threshold value, if the wireless power transmission apparatus 10 continues to receive the reception power measurement result 34 indicative of 'great' or 'small' N times, the wireless power transmission apparatus 10 can stop the transmission of the wireless power as a measure against the detection of foreign objects at step S420.

Figure 5:
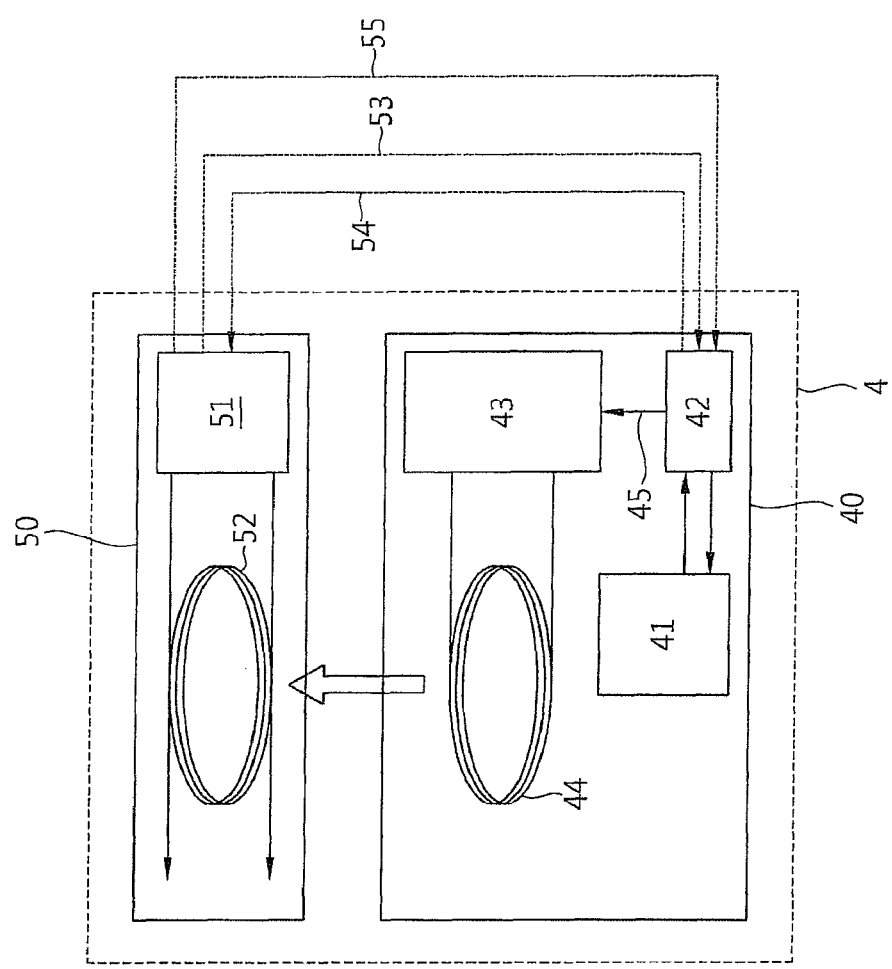
FIG. 5 illustrates the elements of a wireless power transmission system in accordance with another example of the present invention.

FIG. 5 illustrates the elements of a wireless power transmission system in accordance with another example of the present invention.

Referring to FIG. 5, the wireless power transmission system 4 includes a wireless power transmission apparatus 40 and at least one wireless power reception apparatus 50. The wireless power transmission apparatus 40 includes a primary coil 44 and an electricity driving unit 43 coupled with the primary coil 44 and configured to supply electricity driving signals to the primary coil 44 in order to generate an electromagnetic field. A control unit 42 is coupled with the electricity driving unit 43. The control unit 42 generates a control signal 45. The electricity driving unit 43 receives the control signal 45 and converts the received control signal 45 into an AC signal in the primary coil 44 in order to generate an induction or resonance magnetic field near the primary coil 44.

The wireless power transmission apparatus 40 can have a specific and proper form, and an exemplary form of the wireless power transmission apparatus 40 is a platform having a power transmission surface. The wireless power reception apparatus 50 can be placed on or near the platform.

The wireless power reception apparatus 50 can be separate from the wireless power transmission apparatus 40. The wireless power reception apparatus 50 includes a secondary coil 52 coupled with an electromagnetic field generated from the wireless power transmission apparatus 40 when the wireless power reception apparatus 50 is placed near the wireless power transmission apparatus 40. In this method, electric power can be transmitted from the wireless power transmission apparatus 40 to the wireless power reception apparatus 50 without a direct electrical contact.

The primary coil 44 and the secondary coil 52 can have specific and proper forms. Each of the primary coil 44 and the secondary coil 52 can be a copper wire on which high permeable magnetic materials, such as ferrite or amorphous metal, are surrounded. The secondary coil 52 may have a single core form or a dual coil form. Or, the secondary coil 52 may include two or more coils.

The wireless power reception apparatus 50 of the wireless power transmission system 4 of FIG. 5 further includes a power measurement unit 51 coupled with the secondary coil 52.

The power measurement unit 51 generates required power information 53 requested by the wireless power reception apparatus 50 and sends the required power information 53 to the control unit 42. The required power information 53 is control information for controlling power to be supplied to the wireless power reception apparatus 50.

For example, the required power information 53 can numerically indicate the amount of power necessary for the wireless power reception apparatus 50. For example, if the wireless power reception apparatus 50 requires power of 10 W, the power measurement unit 51 can generate the required power information 53 indicating 10 W.

The control unit 42 checks the required power information 53 and generates the control signal 45 so that power indicated by the required power information 53 is generated. For example, when the required power information 53 indicates 10 W, the control unit 42 generates the control signal 45 so that power of 10 W is transmitted. The electricity driving unit 43 receives the control signal 45 and converts the received control signal 45 into an AC signal in the primary coil 44 in order to generate an induction or resonance magnetic field near the primary coil 44.

The wireless power transmission apparatus 40 further includes a primary power measurement unit 41. The primary power measurement unit 41 measures power generated from the primary coil 44 in response to the AC signal. For example, the required power information 53 indicates 10 W, but actually generated power can be measured as 12 W. That is, in order for power, actually received by the wireless power reception apparatus 50, to become 10 W in response to the indication of the required power information 53, the primary coil 44 generates power of 12 W higher than power of 10 W. This is because power of 2 W has been lost due to foreign objects attributable to a parasitic load near the wireless power transmission system 4 in a process of the wireless power being transmitted from the primary coil 44 to the secondary coil 52.

The control unit 42 configures or generates a generated power measurement report 54 indicative of generation power measured by the primary power measurement unit 41 and sends the generated power measurement report 54 to the power measurement unit 51. As described above, the wireless power transmission system 4 supports a bidirectional communication method by which the control information 53 may be transmitted along a path from the wireless power reception apparatus 50 to the wireless power transmission apparatus 40 and the pieces of control information 54 and 55 may be transmitted along a path from the wireless power transmission apparatus 40 to the wireless power reception apparatus 50.

The power measurement unit 51 compares the required power with indicated power indicated by the generated power measurement report 54, analyzes a difference between the required power and the indicated power, and determines whether or not to make an FOD declaration based on a result of the analysis.

In an embodiment, the power measurement unit 51 can determine whether a difference between the required power and the indicated power indicated by the generated power measurement report 54 is greater than or equal to or smaller than a threshold value and indicate a result of the determination as a reception power measurement result 55, For example, if a difference between the required power and the indicated power indicated by the generated power measurement report 54 is greater than the threshold value, the power measurement unit 51 can set the reception power measurement result 55 to 1. If a difference between the required power and the indicated power indicated by the generated power measurement report 54 is smaller than or equal to the threshold value, the power measurement unit 51 can set the reception power measurement result 55 to 0. Or, if a difference between the required power and the indicated power indicated by the generated power measurement report 54 is greater than or equal to the threshold value, the power measurement unit 51 may set the reception power measurement result 55 to 1. If a difference between the required power and the indicated power indicated by the generated power measurement report 54 is smaller than the threshold value, the power measurement unit 51 may set the reception power measurement result 55 to 0. In this case, the subjects indicated by the values 0 and 1 of the reception power measurement result 55 may be changed.

For example, it is assumed that the threshold value is 1 W. If, as in the above example, the indicated power indicated by the generated power measurement report 54 is 12 W and the required power is 10 W, a difference between the indicated power and the required power is 2 W, which is greater than the threshold value of 1 W. In this case, the reception power measurement result 55 indicates 1. If a difference between the required power and the indicated power indicated by the generated power measurement report 54 is greater than the threshold value, it may mean that foreign objects have been detected.

An embodiment in which the power measurement unit 51 compares required power with indicated power indicated by the generated power measurement report 54 and analyzes a difference between the required power and the indicated power in order to make an FOD declaration has been described above. However, the power measurement unit 51 may compare power, actually received by the wireless power reception apparatus 50, with indicated power indicated by the generated power measurement report 54, analyze a difference between the actually received power and the indicated power, and make an FOD declaration based on a result of the analysis. Here, a method for the comparison and analysis can be performed like the method of comparing required power with indicated power indicated by the generated power measurement report 54 and analyzing a difference between the required power and the indicated power.

If the wireless power transmission apparatus 40 sends wireless power greater than required power (or power actually received by the wireless power reception apparatus 50) by a certain amount or higher or excessive wireless power owing to a loss due to foreign objects and thus the transmitted wireless power satisfies the required power, an FOD declaration is made in order to stop or suspend the transmission of the wireless power because wireless power efficiency can be deteriorated. In this sense, the reception power measurement result 55 (=1) may have the same meaning as the FOD declaration. For example, if the reception power measurement result 55(=1) continues to remain intact for a specific time, it means that foreign objects continue to be present and the wireless power transmission apparatus 40 can stop or suspend the transmission of wireless power.

The control unit 42 receives the reception power measurement result 55. If it is determined that a significant parasitic load is present near the wireless power transmission apparatus 40 based on the reception power measurement result 55, the control unit 42 can enter a suspending mode in which the driving of the primary coil 44 is decreased or stopped in order to prevent the generation of the parasitic load. Accordingly, the supply of inefficient induction power can be limited or stopped. That is, the wireless power transmission apparatus 40 takes an action against the detection of foreign objects. Or, the power measurement unit 51 may enter a suspending mode in which the driving of the primary coil 44 is decreased or stopped in order to prevent the generation of heat from a parasitic load. That is, the wireless power reception apparatus 50 takes an action against the detection of foreign objects.

As described above, the present invention provides bidirectional power control technology in which the wireless power transmission apparatus 40 sends wireless power to the wireless power reception apparatus 50 and the control unit 42 also sends the generated power measurement report 54, indicating power generated from or transmitted by the wireless power transmission apparatus 40, to the wireless power reception apparatus 50.

Figure 6:
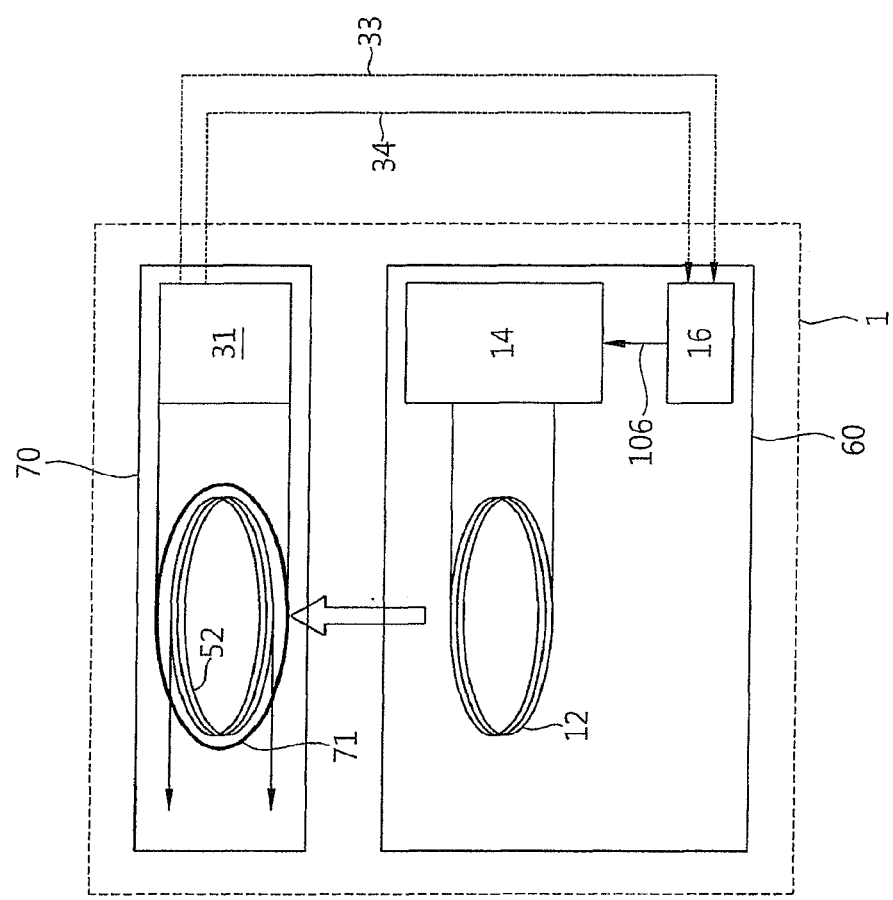
FIG. 6 illustrates the elements of a wireless power transmission system in accordance with yet another example of the present invention.

FIG. 6 illustrates the elements of a wireless power transmission system in accordance with yet another example of the present invention.

Referring to FIG. 6, a wireless power transmission apparatus 60 has the same elements as the wireless power transmission apparatus 10 of FIG. 1. Meanwhile, a wireless power reception apparatus 70 has the same elements as the wireless power reception apparatus 30 of FIG. 1 except that it further includes a measurement coil 71. The power measurement unit 31 is coupled with the measurement coil 71. The measurement coil 71 may be provided in such a way as to surround the outside of the secondary coil 52 or may be provided within the secondary coil 52 in such a way as to surround the inside of the secondary coil 52.

When a magnetic field or a current or voltage is primarily induced in the secondary coil 52 by means of magnetic induction or magnetic resonance between the primary coil 12 and the secondary coil 52, a magnetic field or a current or voltage is secondarily induced in the measurement coil 71. The power measurement unit 31 can measure received wireless power using the magnetic field or a current or voltage secondarily induced in the measurement coil 71.

FIG. 6 illustrates an example in which the measurement coil 71 is further added to the wireless power reception apparatus 30 of FIG. 1, but the measurement coil 71 may be likewise included in the wireless power reception apparatus 50 of FIG. 5.

Figure 7:
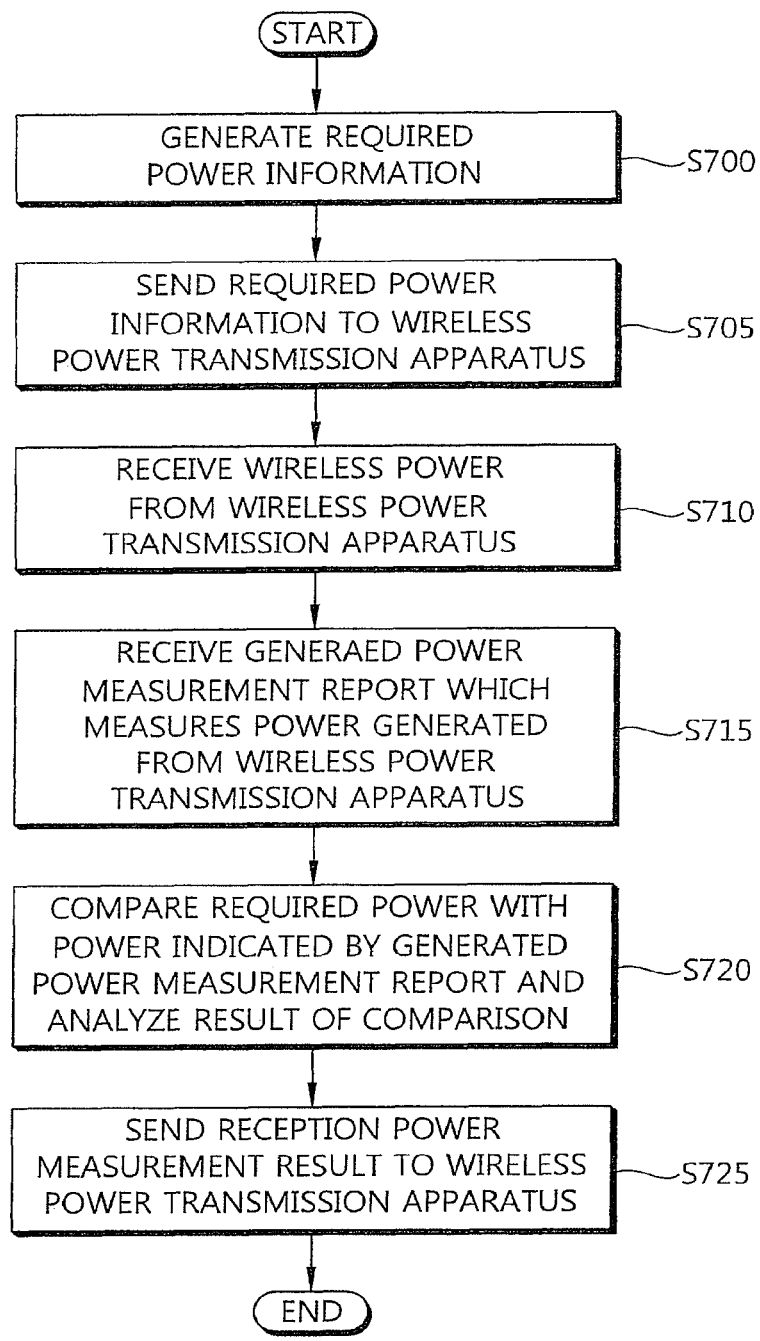
FIG. 7 illustrates another example of a method by which a wireless power reception apparatus using the present invention detects foreign objects.

FIG. 7 illustrates another example of a method by which the wireless power reception apparatus 50 using the present invention detects foreign objects.

Referring to FIG. 7, the wireless power reception apparatus generates the required power information indicative of required power requested by the wireless power reception apparatus at step S700.

The wireless power reception apparatus sends the required power information to the wireless power transmission apparatus at step S705. When the wireless power transmission apparatus generates power in response to the required power information, the wireless power reception apparatus receives wireless power based on magnetic induction or resonant induction from the wireless power transmission apparatus at step S710.

The wireless power reception apparatus receives the generated power measurement report, which measures (or indicates) the power generated from the wireless power transmission apparatus 40, from the wireless power transmission apparatus at step S715. Here, the power generated from the wireless power transmission apparatus does not include a loss attributable to foreign objects and may differ from wireless power actually received by the wireless power reception apparatus. For example, if a loss attributable to foreign objects is included in the power generated from the wireless power transmission apparatus, the wireless power actually received by the wireless power reception apparatus can be measured as being lower than the generated power.

The wireless power reception apparatus compares the required power (or actually received power) with the indicated power indicated by the generated power measurement report, analyzes a result of the comparison, and determines whether or not to make an FOD declaration based on a result of the analysis at step S720.

In an embodiment, the wireless power reception apparatus can determine whether a difference between the required power and the indicated power indicated by the generated power measurement report is greater than or equal to or smaller than a threshold value and indicate a result of the determination as the reception power measurement result. For example, if a difference between the required power and the indicated power indicated by the generated power measurement report is greater than the threshold value, the wireless power reception apparatus can set the reception power measurement result to 1. If a difference between the required power and the indicated power indicated by the generated power measurement report is smaller than or equal to the threshold value, the wireless power reception apparatus can set the reception power measurement result to 0. Or, if a difference between the required power and the indicated power indicated by the generated power measurement report is greater than or equal to the threshold value, the wireless power reception apparatus may set the reception power measurement result to 1. If a difference between the required power and the indicated power indicated by the generated power measurement report is smaller than the threshold value, the wireless power reception apparatus may set the reception power measurement result to 0. The subjects indicated by the values 0 and 1 of the reception power measurement result may be changed.

For example, it is assumed that the threshold value is 1 W. If, as in the above example, the indicated power indicated by the generated power measurement report is 12 W and the required power is 10 W, a difference between the indicated power and the required power is 2 W, which is greater than the threshold value of 1 W. In this case, the reception power measurement result indicates 1. If a difference between the required power and the indicated power indicated by the generated power measurement report is greater than the threshold value, it may mean that foreign objects have been detected.

The wireless power reception apparatus sends the reception power measurement result, reporting a result of the comparison and analysis, to the wireless power transmission apparatus at step S725.

Figure 8:
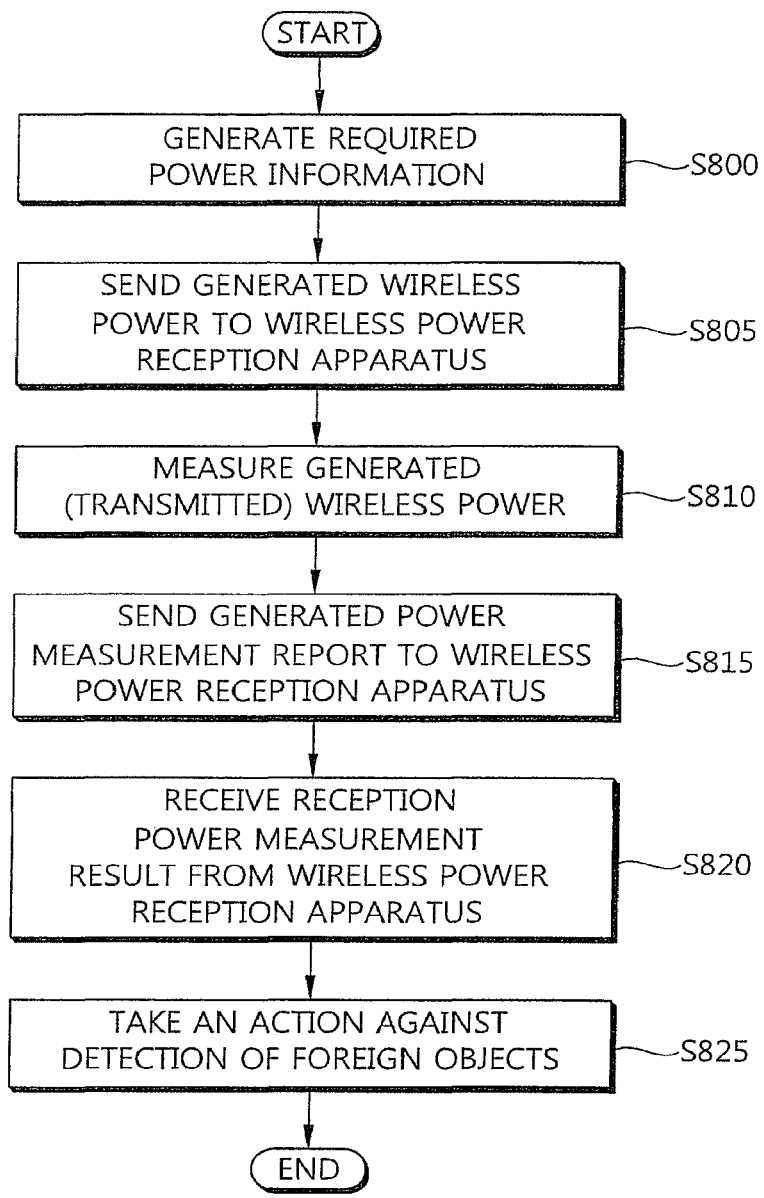
FIG. 8 illustrates another example of a method by which a wireless power transmission apparatus using the present invention detects foreign objects.

FIG. 8 illustrates another example of a method by which the wireless power transmission apparatus using the present invention detects foreign objects.

Referring to FIG. 8, the wireless power transmission apparatus receives the required power information from the wireless power reception apparatus at step S800. The wireless power transmission apparatus generates wireless power based on magnetic induction in response to required power indicated by the required power information. That is, the wireless power transmission apparatus checks the required power information and generates the control signal so that the power indicated by the required power information is induced. For example, when the required power information indicates 10 W, the wireless power transmission apparatus generates the control signal so that power of 10 W is transmitted. The electricity driving unit receives the control signal and converts the received control signal into an AC signal in the primary coil in order to generate an induction electromagnetic field near the primary coil.

The wireless power transmission apparatus sends the generated wireless power to the wireless power reception apparatus at step S805.

At this time, the wireless power transmission apparatus measures power generated from the primary coil in response to the AC signal at step S810. For example, the required power information indicates 10 W, but actually generated power may be measured as being 12 W. That is, in order to transfer the power of 10 W to the wireless power reception apparatus in response to the indication of the required power information, the primary coil generates power of 12 W higher than the power of 10 W. This is because power of 2 W has been lost due to foreign objects attributable to a parasitic load in a process of the wireless power being transmitted from the primary coil to the secondary coil.

The wireless power transmission apparatus configures the generated power measurement report indicating the measured generation power and sends the configured generated power measurement report to the wireless power reception apparatus at step S815. As described above, a bidirectional communication method by which control information may be transmitted along a path from the wireless power transmission apparatus to the wireless power reception apparatus and the control information may be transmitted along a path from the wireless power reception apparatus to the wireless power transmission apparatus is made possible.

The wireless power transmission apparatus receives the reception power measurement result, that is, a result of comparison and analysis for the required power (or actually received power) and the indicated power indicated by the generated power measurement report, from the wireless power reception apparatus at step S820.

The reception power measurement result is information indicating whether a difference between the required power and the indicated power indicated by the generated power measurement report is greater than or equal to or smaller than a threshold value. For example, if a difference between the required power and the indicated power indicated by the generated power measurement report is greater than the threshold value, the secondary reception power measurement result can be set to 1. If a difference between the required power and the indicated power indicated by the generated power measurement report is smaller than or equal to the threshold value, the reception power measurement result can be set to 0. In contrast, if a difference between the required power and the indicated power indicated by the generated power measurement report is greater than or equal to the threshold value, the reception power measurement result may be set to 1. If a difference between the required power and the indicated power indicated by the generated power measurement report is smaller than the threshold value, the reception power measurement result may be set to 0. The subjects indicated by the values 0 and 1 of the reception power measurement result may be changed.

For example, it is assumed that the threshold value is 1 W. If, as in the above example, the indicated power indicated by the generated power measurement report is 12 W and the required power is 10 W, a difference between the indicated power and the required power is 2 W, which is greater than the threshold value of 1 W. In this case, the reception power measurement result indicates 1. If a difference between the required power and the indicated power indicated by the generated power measurement report is greater than the threshold value, it may mean that foreign objects have been detected. Accordingly, the wireless power transmission apparatus 40 can recognize this as an FOD declaration.

If it is determined that foreign objects have been detected as a result of analyzing the reception power measurement result, the wireless power transmission apparatus takes an action against the detection of the foreign objects at step S825. For example, the wireless power transmission apparatus can enter a suspending mode in which the driving of the primary coil 12 is decreased or stopped. Accordingly, the generation of heat from a parasitic load can be prevented, and the supply of inefficient induction power can be limited or stopped.

Figure 9:
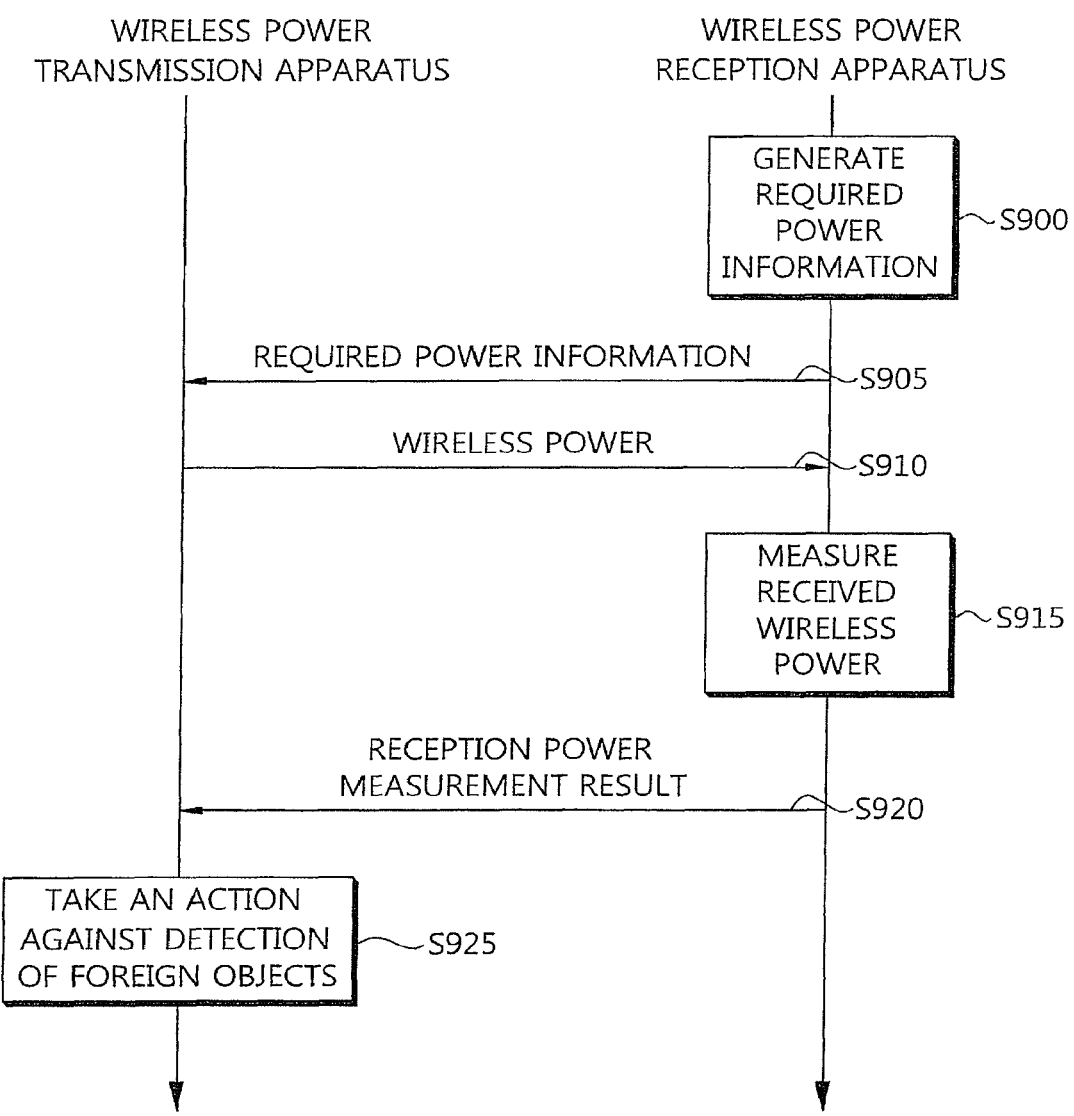
FIG. 9 is a flowchart illustrating the operation of the wireless power transmission apparatus and the wireless power reception apparatus using the present invention.

FIG. 9 is a flowchart illustrating the operation of the wireless power transmission apparatus and the wireless power reception apparatus using the present invention.

Referring to FIG. 9, the wireless power reception apparatus generates the required power information indicative of power requested by the wireless power reception apparatus at step S900.

The wireless power reception apparatus sends the required power information to the wireless power transmission apparatus at step S905. When the primary coil of the wireless power transmission apparatus generates the required power in response to the required power information, the secondary coil of the wireless power reception apparatus receives wireless power based on magnetic induction or magnetic resonance from the wireless power transmission apparatus at step S910.

The wireless power reception apparatus measures wireless power received in response to the required power information at step S915. The power measurement unit may measure wireless power induced in the secondary coil or may measure wireless power secondarily induced from the secondary coil to the measurement coil. Here, the measured power can be calculated based on a difference between initial wireless power (or required power), transferred from the wireless power transmission apparatus to the wireless power reception apparatus, and a loss attributable to foreign objects, such as a parasitic load that is present nearby.

The wireless power reception apparatus provides the wireless power transmission apparatus with the reception power measurement result that reports a result of comparison and analysis for the required power and the measured power ate step S920.

In an embodiment, the reception power measurement result can be defined as a difference between the required power and the measured power.

In another embodiment, the reception power measurement result can be defined as the measured power itself.

In yet another embodiment, the reception power measurement result may be defined in the form of a flag (0 or 1) indicating whether or not there is a difference between the required power and the measured power.

In further yet another embodiment, the reception power measurement result can be defined as a result indicating whether a difference between the required power and the measured power is greater than or equal to or smaller than a threshold value.

In further yet another embodiment, the reception power measurement result can be defined as information that is transmitted to the wireless power transmission apparatus only when there is a difference between the required power and the measured power. That is, if there is no difference between the required power and the measured power, the reception power measurement result is not transmitted to the wireless power transmission apparatus. In this case, the step S920 may be omitted.

In further yet another embodiment, the reception power measurement result can be defined as a result indicating whether the measured power is greater than or smaller than the required power. For example, the reception power measurement result can be indicated by 'high' or 'low'. Here, 'high' indicates that the measured power is greater than the required power, and 'low' indicates that the measured power is smaller than the required power. Or, the reception power measurement result may be indicated by any one of three states, including 'high', 'low', and 'equal'.

If it is determined that foreign objects have been detected as a result of analyzing the reception power measurement result, the wireless power transmission apparatus takes an action against the detection of the foreign objects at step S925. For example, the wireless power transmission apparatus enters a suspending mode in which the driving of the primary coil is decreased or stopped. Accordingly, the generation of heat from a parasitic load can be prevented, and the supply of inefficient induction power can be limited or stopped.

The action taken by the wireless power transmission apparatus against the detection of foreign objects can include the following embodiments. For example, in an embodiment in which the reception power measurement result indicates whether the measured power is greater than ('high') or smaller than ('low') the required power, the wireless power transmission apparatus determines whether or not the reception power measurement result indicating 'low' or 'high' has been received identically and continuously N times. Here, N indicates the number of times of continuous reception of 'low' or 'high' that is necessary for the wireless power transmission apparatus to stop the transmission of wireless power, and N can be 2 (N=2). For example, if the reception power measurement result indicating 'low' has been continuously received twice, the wireless power transmission apparatus can stop the transmission of wireless power as a measure against the detection of foreign objects. In contrast, if the reception power measurement result indicating 'high' has been continuously received twice, the wireless power transmission apparatus can stop the transmission of the wireless power as a measure against the detection of foreign objects.

In contrast, if the reception power measurement result indicating 'low' or 'high' has been continuously received less than two times, the wireless power transmission apparatus determines that foreign objects have not been detected and thus can send the wireless power to the wireless power reception apparatus again. For example, if the reception power measurement result previously indicating 'low' was received, but the reception power measurement result now indicating 'high' is received, the wireless power transmission apparatus does not stop the transmission of the wireless power because the same reception power measurement result does not continue to be received.

For another example, in an embodiment in which the reception power measurement result indicates that there is a difference between the required power and the measured power, if the wireless power transmission apparatus continues to receive the reception power measurement result indicative of 'present difference' N times, the wireless power transmission apparatus can stop the transmission of the wireless power as a measure against the detection of foreign objects.

For yet another example, in an embodiment in which the reception power measurement result indicates that a difference between the required power and the measured power is greater than or equal to or smaller than the threshold value, if the wireless power transmission apparatus continues to receive the reception power measurement result indicative of 'great' or 'small' N times, the wireless power transmission apparatus can stop the transmission of the wireless power as a measure against the detection of foreign objects.

All the functions can be executed by a processor, such as a microprocessor, a controller, a microcontroller, or an Application Specific Integrated Circuit (ASIC) according to software or a program code coded to perform the above functions. It can be said that the design, development, and implementation of the code is evident to those skilled in the art based on the description of the present invention.

In accordance with the present invention, foreign objects intervened between the wireless power transmission apparatus and the wireless power reception apparatus are recognized, and a user removes the foreign objects. Accordingly, damage to a device attributable to foreign objects can be prevented.

Although a few of the embodiments of the present invention have been shown and described above, a person having ordinary skill in the art will appreciate that the present invention can be modified, changed, and implemented in various ways without departing from the principles, spirit and scope of the present invention. Accordingly, the present invention is not limited to the embodiments, and the present invention can be said to include all embodiments within the scope of the claims below and their equivalents.

The invention claimed is:

1. A wireless power reception apparatus, comprising:
   a secondary coil configured to receive wireless power from a wireless power transmission apparatus via a magnetic field; and
   a controller configured to:
      communicate control information for controlling power supplied by the wireless power transmission apparatus, the control information indicating a requested power of the wireless power reception apparatus,
      measure a plurality of measured power values indicative of respective amounts of power that the wireless power reception apparatus receives from the wireless power transmission apparatus in response to the control information, and
      detect that a foreign object has been placed in the magnetic field based on a determination that at least two consecutive measured power values indicate a deviation from the requested power.

2. The wireless power reception apparatus of claim 1, wherein the controller is further configured to inform the wireless power transmission apparatus to stop or suspend transmission of the wireless power based on a detection of the foreign object.

3. The wireless power reception apparatus of claim 1, wherein the controller is further configured to communicate an indication to the wireless power transmission apparatus based on a detection of the foreign object.

4. The wireless power reception apparatus of claim 1, wherein the controller is configured to:
   generate a plurality of reception power measurement results, wherein each reception power measurement result indicates a difference between a corresponding measured power value and the requested power,
   detect the foreign object when at least two consecutive reception power measurement results indicate differences that exceed a threshold amount.

5. The wireless power reception apparatus of claim 1, wherein the controller is configured to:
   generate a plurality of reception power measurement results, wherein each reception power measurement result indicates whether a corresponding power measurement value is greater than, equal to, or smaller than the requested power; and
   detect the foreign object when at least two consecutive reception power measurement results indicate at least two corresponding power measurement values are both greater than or both smaller than the requested power.

6. The wireless power reception apparatus of claim 1, wherein the secondary coil is magnetically or resonantly coupled via the magnetic field with a primary coil of the wireless power transmission apparatus.

7. The wireless power reception apparatus of claim 1, wherein the controller is further configured to communicate a foreign object detection (FOD) declaration in response to detecting the foreign object.

8. The wireless power reception apparatus of claim 1, wherein the controller is configured to:
   detect the foreign object based on an analysis of N consecutive measured power values measured during reception of the wireless power after communicating the control information indicating the requested power.

9. The wireless power reception apparatus of claim 1, wherein the controller is configured to:
   detect, by the wireless power reception apparatus, that the foreign object has been placed in the magnetic field during reception of the wireless power when at least N consecutive measured power values indicate a difference between received power and the requested power exceeds a threshold amount.

10. A method at a wireless power reception apparatus of a wireless power system, comprising:

communicating control information for controlling power supplied by a wireless power transmission apparatus of the wireless power system, the control information indicating a requested power of the wireless power reception apparatus;

receiving wireless power from the wireless power transmission apparatus via a magnetic field;

measuring a plurality of measured power values indicative of respective amounts of power that the wireless power reception apparatus receives from the wireless power transmission apparatus; and detecting that a foreign object has been placed in the magnetic field based on a determination that at least two consecutive power values indicate a deviation from the requested power.

11. The method of claim 10, further comprising informing the wireless power transmission apparatus to stop or suspend transmission of the wireless power based on detecting the foreign object.

12. The method of claim 10, further comprising communicating an indication to the wireless power transmission apparatus based on detecting the foreign object.

13. The method of claim 10, further comprising:

generating a plurality of reception power measurement results, wherein each reception power measurement result indicates a difference between a corresponding measured power value and the requested power; and detecting the foreign object when at least two consecutive reception power measurement results indicate differences that exceed a threshold amount.

14. The method of claim 10, further comprising:

generating a plurality of reception power measurement results, wherein each reception power measurement result indicates whether a corresponding power measurement value is greater than, equal to, or smaller than the requested power; and detecting the foreign object when at least two consecutive reception power measurement results indicate at least two corresponding power measurement values are both greater than or both smaller than the requested power.

15. The method of claim 10, further comprising communicating a foreign object detection (FOD) declaration in response to detecting the foreign object.

16. The method of claim 10, further comprising:

detecting the foreign object based on an analysis of N consecutive measured power values measured during reception of the wireless power after communicating the control information indicating the requested power.

17. The method of claim 10, further comprising:

detecting, by the wireless power reception apparatus, that the foreign object has been placed in the magnetic field during reception of the wireless power when at least N consecutive measured power values indicate a difference between received power and the requested power exceeds a threshold amount.

* * * * *